United States Patent
Tanimura et al.

[11] Patent Number: 6,116,018
[45] Date of Patent: Sep. 12, 2000

[54] GAS TURBINE PLANT WITH COMBUSTOR COOLING SYSTEM

[75] Inventors: Satoshi Tanimura; Shigemi Mandai; Tetsuo Gora; Hiroyuki Nishida, all of Hyogo-ken, Japan

[73] Assignee: Mitsubishi Heavy Industries, Ltd., Tokyo, Japan

[21] Appl. No.: 09/035,615

[22] Filed: Mar. 5, 1998

[51] Int. Cl.[7] .................................................. F02C 7/16
[52] U.S. Cl. ............................. 60/39.3; 60/39.75; 60/730
[58] Field of Search ........................... 60/39.05, 39.182, 60/39.3, 39.55, 39.75, 730

[56] References Cited

U.S. PATENT DOCUMENTS

| | | | |
|---|---|---|---|
| 3,359,723 | 12/1967 | Bohensky et al. | 60/39.05 |
| 3,747,336 | 7/1973 | Dibelius et al. | 60/39.3 |
| 5,340,274 | 8/1994 | Cunha | 60/39.05 |
| 5,579,631 | 12/1996 | Chen et al. | 60/39.05 |

*Primary Examiner*—Louis J. Casaregola
*Attorney, Agent, or Firm*—John P. White; Cooper & Dunham LLP

[57] ABSTRACT

A gas turbine plant having a compressor, gas turbine, and combustor, comprising a cooling system adapted to cool the wall of the combustor by means of air compressed by the combustor when the load of the gas turbine and/or the combustion load of the combustor is low, and an additional cooling system adapted to cool the wall of the combustor by means of a cooling medium different from the air in addition to the cooling by means of the air when the load of the gas turbine is increased.

8 Claims, 2 Drawing Sheets

GAS TURBINE PLANT WITH COMBUSTOR COOLING SYSTEM

BACKGROUND OF THE INVENTION

The present invention relates to a cooling technique for a gas turbine plant including a compressor, gas turbine, and combustor, and more particularly, to a gas turbine plant including an improved combustor.

Referring now to FIGS. 1 and 2, there is shown a conventional gas turbine plant that uses air as its cooling medium. In FIG. 1, compressed air 11 compressed by means of a compressor 10 is guided to a combustor 12, whereupon it is burned together with a fuel to form a combustion gas 16. The gas 16 is fed to a gas turbine 13 to drive it.

The wall of the combustor 12, which is exposed to high temperature, is cooled by introducing some of the compressed air 11 as cooling air 6 into the combustor 12. FIG. 2 shows a wall cooling structure for the combustor 12. A wall 1 of the combustor 12 is of a dual structure having a space therein. A large number of passages are divided by partition walls in this space.

The cooling air 6 introduced through a large number of cooling air inlet ports 2a in the outer surface of the combustor wall 1 passes through the passages that are divided by the partition walls, thereby effecting impact jet cooling 12a and convection cooling 12b. As the air 6 is discharged into the combustion gas 16 through cooling air outlet ports 3a after cooling the combustor wall 1 in this manner, its subject the combustion gas side of the combustor wall 1 to film-cooling 12c.

Referring now to FIGS. 3 and 4, a gas turbine plant using steam or some other cooling medium will be described. In order to improve the thermal efficiency of modern gas turbines, the combustor wall is subjected to impact jet cooling and convection cooling with use of steam, which has a high cooling effect, in place of air. This cooling medium may be discharged into the combustion gas or recovered entirely.

FIG. 3 is a cooling system diagram showing an example of the gas turbine plant that uses steam as its cooling medium. As shown in FIG. 3, a cooling medium 7 is supplied by means of a cooling medium supplier 15, which utilizes the power or waste heat of a gas turbine. Accordingly, the medium 7 cannot be supplied when the gas turbine is activated. Before the supply conditions of the supplier 15 are settled, therefore, the cooling medium 7 is supplied by means of an auxiliary cooling medium supplier 17. When the conditions of the supplier 15 are settled, thereafter, the auxiliary supplier 17 is switched over to the supplier 15 by means of a cooling medium changer 18, and the supply of the cooling medium 7 is continued. FIG. 4 shows an example of a combustor wall cooling structure. In this example, the entire cooling medium (steam) is recovered.

The cooling medium 7 supplied from the supplier 15 or the auxiliary supplier 17 is introduced through a cooling medium supply header 8. The supply header 8, which has a cooling medium passage therein, is provided on one side portion of the outer surface of a dual-structure combustor wall 1. The medium 7 flows into the passage through cooling medium inlet ports 4, thereby subjecting the wall 1 to impact jet cooling and convection cooling. Thereafter, the medium 7 is recovered through cooling medium outlet ports 5 by means of a cooling medium recovery header 9. The cooling medium passage, which includes a space in the double-wall structure, is provided over the combustor wall 1 inside the supply header 8. The outlet ports 5 are formed in the other side portion of the outer surface of the wall 1.

In the case where air compressed by means of the compressor is used for cooling, as shown in FIGS. 1 and 2, a predetermined turbine inlet temperature can be obtained only by previously increasing the combustion gas temperature by a margin corresponding to a gas temperature drop that is caused as the cooling air is discharged into the combustion gas after the combustor is cooled, as shown in FIG. 5. Since the rise of the combustion gas temperature causes the delivery of $NO_X$ gas to increase exponentially, it constitutes a hindrance to the development of low-$NO_X$ gas turbine plants.

In the case where steam is used as the cooling medium 7 for cooling the combustor wall 1, the cooling medium may be discharged into the combustion gas 16. As in the aforesaid case of the air-cooling system, therefore, the combustion gas temperature must be increased, so that the delivery of $NO_X$ increases inevitably.

When the cooling medium 7 is recovered, moreover, the cooling medium supplier 15 is used that utilizes the power or waste heat of the gas turbine, as shown in FIG. 3. Accordingly, activating the gas turbine separately requires use of the auxiliary cooling medium supplier 17. Besides, in this case, the cooling medium changer 18 must be used to replace the two suppliers 15 and 17 with each other.

BRIEF SUMMARY OF THE INVENTION

The object of the present invention is to provide a gas turbine plant furnished with a combustor, in which the quantity of cooling air to be discharged into combustion gas can be reduced to restrain the delivery of $NO_X$ that accompanies an increase of the combustion gas temperature, without requiring use of any cooling system equipment or auxiliary cooling medium supplier.

In order to achieve the above object, according to the present invention, there is provided a gas turbine plant designed as follows. When the load of a gas turbine or the combustion load of a combustor is low, some of compressed air compressed by means of a compressor is used as a cooling medium. When a cooling medium supplier in the gas turbine plant starts to function as the gas turbine load increases, cooling is carried out in response to the combustor temperature or the gas turbine load, for example. After the cooling is finished, the cooling medium recovered without being discharged into a combustion gas is used for additional cooling.

The combustor according to the invention has a dual-structure wall having a large number of passages divided inside by partition walls. A cooling system for the combustor wall includes cooling air inlet and outlet ports, which are formed in the wall and communicate with the passages, and cooling medium supply and recovery headers provided on the wall of the combustor with a suitable space between them. These headers are provided individually with cooling medium inlet and outlet ports that communicate with the passages. In this arrangement, the passages for the cooling air are different from the passages for the cooling medium.

According to the combustor of the invention constructed in this manner, the combustor wall is cooled by means of only the air discharged into a main combustion gas flow after cooling when the gas turbine load is low, and is additionally cooled by means of the high-effect cooling medium recovered without being discharged into the main combustion gas flow after cooling when the load is increased. Thus, the cooling system can be controlled by means of only an on-off valve for only starting and stopping the cooling medium supply. In consequence, the cooling system can be simplified, and its reliability can be improved.

Since the cooling medium is recovered according to this method, compared with the method in which all the cooling medium is discharged into the combustion gas, it is necessary only that just enough cooling air to cool the combustor wall be discharged into the main combustion gas flow only when the load is low.

Accordingly, the combustion gas temperature, which conventionally is expected to be increased in advance, can be lowered, so that the delivery of $NO_X$ can be restrained.

Thus, according to the cooling system for the combustor of the present invention, there is no need to use any auxiliary cooling medium supplier that has conventionally been a necessity, and the cooling medium changer can be replaced with the simple on-off valve.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
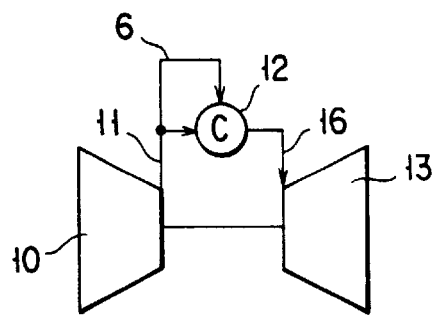
FIG. 1 is a system diagram of a conventional gas turbine based on air-cooling.
Figure 2:
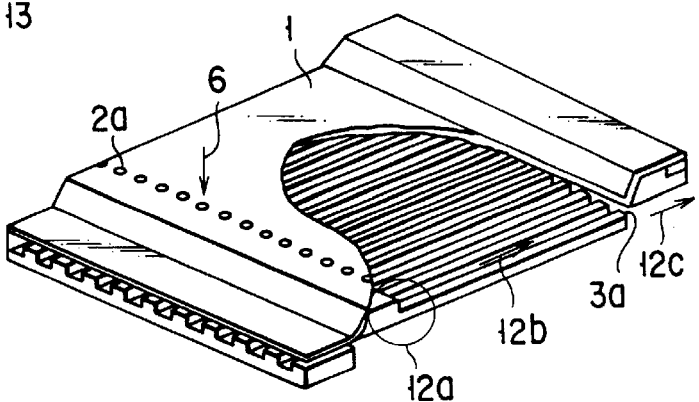
FIG. 2 is a schematic view showing a conventional air-cooled combustor.

A combustor according to an embodiment of the present invention will now be described in detail with reference to the accompanying drawings of FIGS. 6 and 7. In the description to follow, like reference numerals are used to designate like portions throughout the drawings for simplicity of illustration.

A gas turbine plant according to the present embodiment comprises a compressor 10, gas turbine 13, combustor 12, cooling medium open-close valve 14, and valve driver 14a. Further, the plant comprises an air-cooling system, which serves to cool the wall of the combustor 12 by means of air compressed by a compressor 1 in the case where the load of the gas turbine 13 and/or the combustion load of the combustor 12 is low. The plant also comprises a steam-cooling system as an additional cooling system, which serves to cool the wall of the combustor 12 by means of steam as a cooling medium 7 when the load of the gas turbine 13 is increased.

The air- and steam-cooling systems are driven by the cooling medium on-off valve 14 and the valve driver 14a. The driver 14a can obtain a gas turbine load signal and/or a combustor temperature, thereby detecting the load of the gas turbine 13 and/or the combustion load of the combustor 12. Based on this detection result, the driver 14a opens or closes the on-off valve 14.

Figure 6:
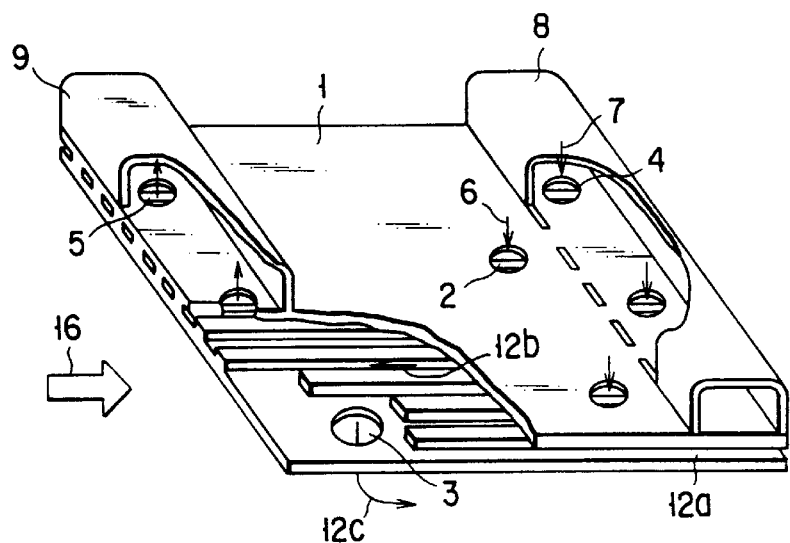
FIG. 6 is a schematic view showing a combustor according to an embodiment of the present invention based on a composite cooling system using air and a cooling medium.
Figure 7:
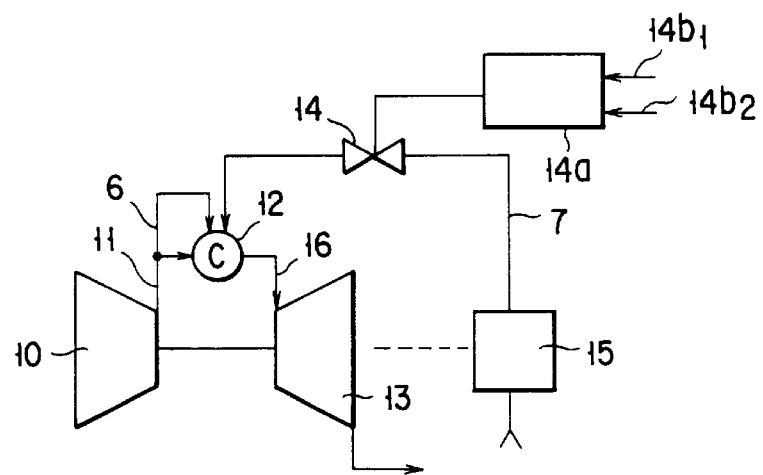
FIG. 7 is a system diagram of a gas turbine according to the embodiment based on composite cooling by means of air and the cooling medium.

Thus, in the combustor 12 according to the present embodiment shown in FIGS. 6 and 7, cooling air 6 compressed by means of the compressor 10 is introduced through a cooling air inlet ports 2 in a combustor wall 1 of a dual structure when the load of the gas turbine 13 is low, that is, when the combustion load of the combustor 12 is small. After the wall 1 is cooled by impact jet cooling 12a and convection cooling 12, the air 6 is discharged through cooling air outlet ports 3 to subject the wall 1 to film-cooling 12c.

When a cooling medium supplier 15 is activated with the gas turbine load increased, a cooling medium supply header 8 is supplied with the cooling medium 7. The medium 7 is fed into the space inside the dual-structure combustor wall 1 through cooling medium inlet ports 4 therein. After the wall 1 is cooled by convection cooling, the medium 7 is recovered through cooling medium outlet ports 5 by means of a cooling medium recovery head 9. Thus, in this case, the cooling by means of the cooling air 6 is carried out simultaneously with the cooling by means of the cooling medium 7.

Inside the dual-structure combustor wall 1, there are a large number of passages that are divided by a number of partition walls. In this arrangement, the cooling air 6 and the cooling medium 7 flow through different passages as they cool the combustor wall 1. In this case, the passages for the air 6 and the medium 7 may be arranged alternately adjacent to one another or some groups of passages may be arranged alternately.

FIG. 7 shows a diagram of a cooling system for the combustor wall described above. When the load of the gas turbine or the combustion load of the combustor is low, some of compressed air 11 compressed by means of the compressor 10 is used as the cooling air 6. When the cooling medium supplier 15 in the gas turbine plant starts to function as the gas turbine load increases, the cooling medium on-off valve 14 is opened for cooling in response to the combustor temperature or the gas turbine load. After the cooling is finished, the cooling medium 7 recovered without being discharged into a combustion gas 16 is used for additional cooling. By doing this, the delivery of $NO_X$ can be restrained from increasing with the rise of the combustion gas temperature.

Figure 3:
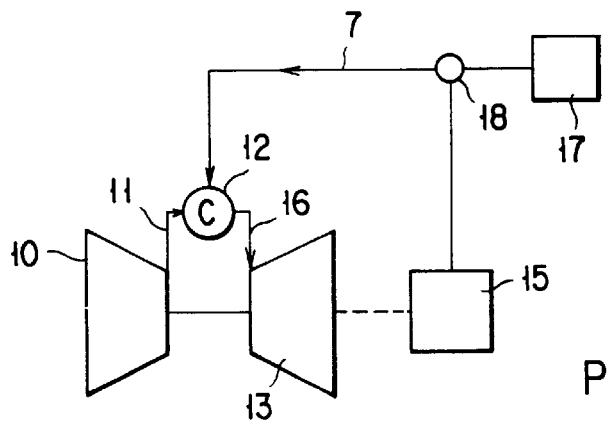
FIG. 3 is a system diagram of a conventional gas turbine based on medium-cooling.
Figure 4:
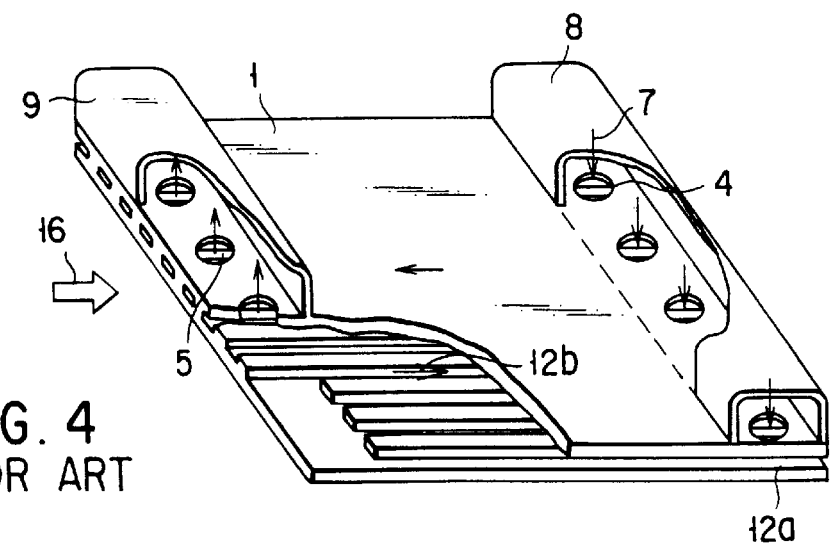
FIG. 4 is a schematic view showing a conventional medium-cooled combustor.
Figure 5:
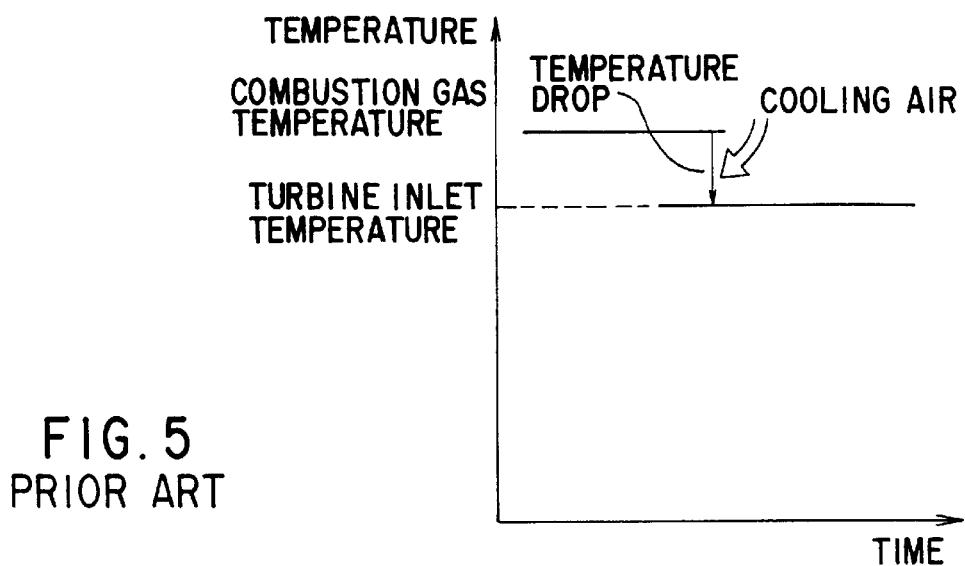
FIG. 5 is a diagram showing the relation between combustion gas temperature and turbine inlet temperature.

Thus, the combustor according to the present invention can dispense with the auxiliary cooling medium supplier 17 of FIG. 3 that is conventionally a vital necessity. Moreover, the cooling system can be simplified by using only the cooling medium on-off valve 14 for the cooling medium supply control in place of the cooling medium changer 18.

According to the combustor of the invention described above, the combustor wall is cooled by means of the air alone when the gas turbine load is low, and is additionally cooled by means of the cooling medium when the load is increased. By doing this, the cooling air discharged into the combustion gas can be reduced, so that the increase of the combustion gas temperature can be lessened. Thus, the increase of the delivery of $NO_X$ can be restrained, and only the cooling medium on-off valve can be used in place of the cooling medium changer without requiring use of the auxiliary cooling medium supplier, that is, the cooling system can be simplified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gas turbine plant having a gas turbine and combustor, comprising:
    a basic cooling system configured to cool the combustor with a first cooling medium;
    an additional cooling system configured to cool the combustor with a second cooling medium;
    a detector configured to detect at least one of the load of the gas turbine and a combustion lead of the combustor; and
    an activator device configured to activate at least one of the additional cooling system and the basic cooling system in accordance with a detection output from the detector.

2. A gas turbine plant according to claim 1, wherein said detector detects a load signal from the gas turbine.

3. A gas turbine plant according to claim 1, wherein said detector detects a temperature of the combustor.

4. A gas turbine plant according to claim 1, wherein said first cooling medium is air and said second cooling medium is steam.

5. A gas turbine plant according to claim 1, wherein said additional cooling system comprises a recover device configured to recover the second cooling medium after the combustor is cooled.

6. A gas turbine plant according to claim 1, wherein said combustor comprises a dual-structure wall having a large number of passages divided inside by partition walls, air inlet and outlet ports provided in the dual-structure wall and communicating with the passages, a cooling medium supply header and a cooling medium recovery header provided on the wall, and cooling medium inlet and outlet ports provided individually in the supply header and said recovery header and communicating with the passages, the passages for the first cooling medium being different from the passages for the second cooling medium.

7. A gas turbine plant according to claim 4, which further comprises a compressor configured to compress air, the compressed air being used for the first cooling medium.

8. A gas turbine plant according to claim 1, wherein said activator device activates only the basic cooling system if at least one of the load of the gas turbine and the combustion load of the combustor is lower than a threshold level and activates both of the basic cooling system and the additional cooling system if at least one of the load of the gas turbine and the combustion load of the combustor is higher than the threshold level.

* * * * *